Aug. 24, 1926.

J. S. WILLIAMSON ET AL

VEHICLE SIGNAL LIGHT

Filed April 24, 1924    2 Sheets-Sheet 1

Inventor
J. S. Williamson
H. L. Beach
By
Hubert Peck   Attorney

Aug. 24, 1926.
J. S. WILLIAMSON ET AL
1,597,497
VEHICLE SIGNAL LIGHT
Filed April 24, 1924
2 Sheets-Sheet 2
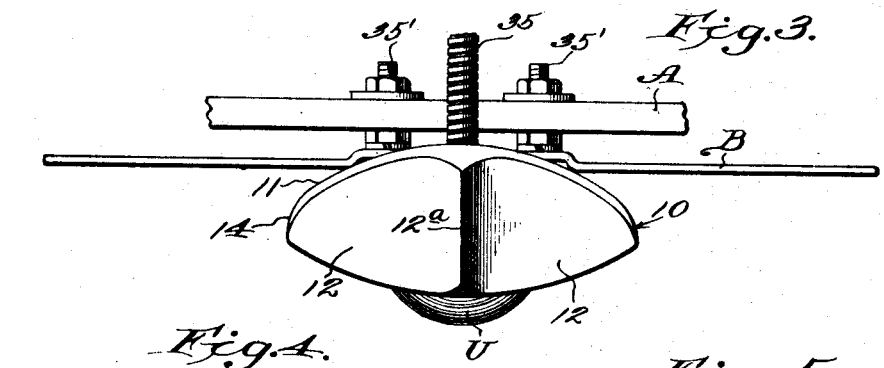
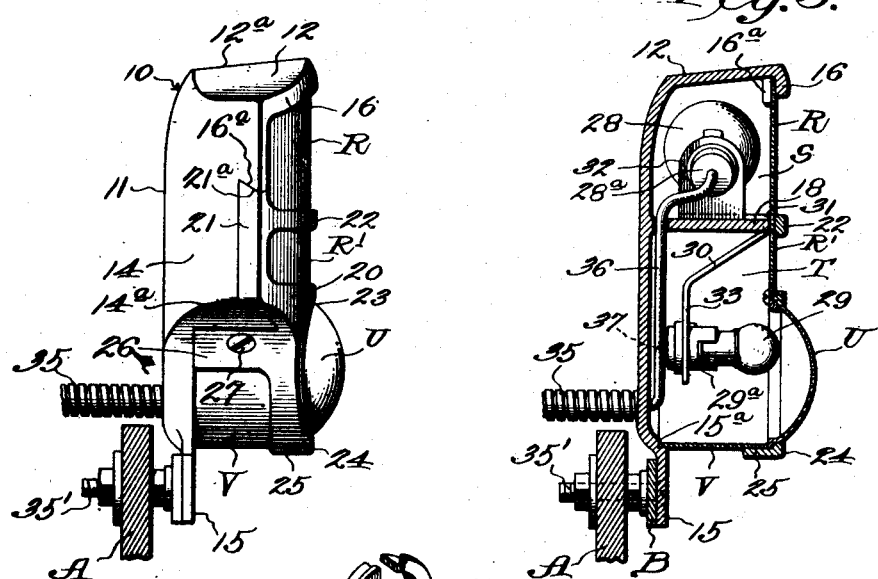
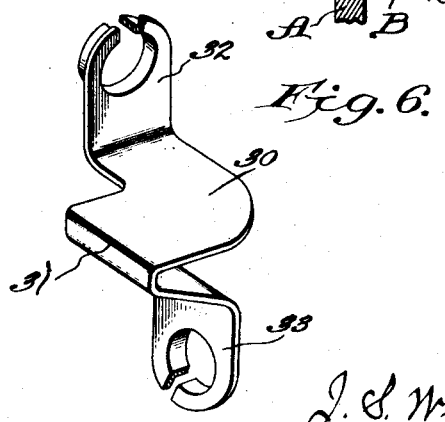
Inventor
J. S. Williamson
H. L. Beach
By Herbert Fick
Attorney Patented Aug. 24, 1926.

1,597,497

UNITED STATES PATENT OFFICE.

JOHN S. WILLIAMSON AND HERBERT L. BEACH, OF BALTIMORE, MARYLAND, ASSIGNORS, BY DIRECT AND MESNE ASSIGNMENTS, TO SIDNEY L. DAVIS, RECEIVER FOR MORGAN MANUFACTURING COMPANY, INC., OF KEENE, NEW HAMPSHIRE.

VEHICLE SIGNAL LIGHT.

Application filed April 24, 1924. Serial No. 708,766.

This invention relates to certain improvements in vehicle signal lights; and the nature and objects of the invention will be readily recognized and understood by those skilled in the arts involved in the light of the following detailed description and explanation of the accompanying drawings illustrating what we at present consider to be the preferred embodiments or mechanical expressions of the invention from among various other forms, arrangements, combinations and constructions of which the invention is capable within the spirit and scope thereof.

More particularly the invention is directed to the well known combination rear or tail and stop signal types of lights in general use on automotive and other vehicles, although certain features of the invention are directed to the various types of automotive vehicle and other lights generally. The combination tail and stop signal types of automobile lights are characterized generally by a casing or housing providing a tail light compartment and a stop signal light compartment in which are mounted suitable sources of light such as electric lamps or bulbs which are independently operated. It is found that a relatively small low candle powered lamp or bulb is sufficient for illuminating the rear or tail signal while a much larger and higher powered lamp is necessary to efficiently illuminate the stop signal. This results in practice in the requirement for a casing of considerable greater depth or thickness than would be necessary if a stop signal lamp of the smaller size could be employed, in order to properly mount and receive the large lamp or bulb for the stop signal.

With these types of signal lights the electric lamps or bulbs are subjected in use to considerable vibration causing breakage of the filaments thereof and frequent replacement which is generally attendant with certain difficulties due to the arrangement of the casing and mountings for the lamps therewithin. Again, this type of automobile signal light is mounted on the exterior of the automobile exposed to the weather and to dirt, dust and such like, so that the provision of a removable portion of the casing to permit of access to the lamps therein results in joints and openings through which water and other foreign matter can enter and materially reduce the efficiency of the light, or even render the same inoperative.

Hence, one of the main and basic aims and objects of the present invention is the elimination of the necessity in the combination tail and stop signal types of signal lights of forming the casing or housing therefor of a greater depth or thickness than required by the smallest electric lamp or bulb to be used therein, by the provision of an arrangement of the different size electric lamps therefor which permits of their being mounted in a casing of a thickness throughout which is determined by the size of the smallest lamp used in mounted position, and thereby materially reduce the size and cost of the casing and secure a more compact and efficient mounting of the light on an automobile or other vehicle.

A further object of the invention is to provide a mounting for the electric lamps or bulbs in vehicle signal lights, which mounting forms a resilient shock absorber to reduce breakage of the lamps from vibration in use and in which the lamps are readily accessible for removal and replacement.

Another object of the invention resides in the formation of a unit mounting for the different sized electric lamps employed in vehicle signal lights of the combination tail and stop signal types, which will arrange and dispose the lamps in the proper operative positions in a casing of relatively small thickness and is so supported and mounted in the casing as to be movable with the lamps as a unit when the casing is opened to permit removal and replacement of the lamps.

A further object of the invention is to provide a casing or housing for vehicle and the like signal lights, having a removable face or lens carrying portion in which joints or openings formed in mounted position with the casing are materially reduced and in which any joints or openings at the upper or top portion of the casing are completely eliminated to prevent entry of water and other foreign matter therein.

Another object of the invention is to provide certain improvements generally in the design, construction and arrangements of combination tail and stop signal lights for automobiles, in order to secure a more compact assembly and a higher efficiency and utility in operation and use, as well as a light of this type which is readily manufactured at a relatively low cost while retaining the desirable characteristics of strength and simplicity.

With the foregoing and certain other objects and results in view, which other objects and results will be readily apparent to and recognized by those skilled in this art from the following description, the invention consists in certain novel features in construction and in combination and arrangement of elements, as will be more fully and particularly referred to and specified hereinafter.

Referring to the accompanying drawings:

Fig. 3, is a top plan view of the light of the invention.

Fig. 4, is a side elevation.

Fig. 5 is a vertical transverse section showing the mounting of the lamp bracket and the tail, stop signal lenses, and license illuminating lenses.

Fig. 6 is a detail prospective view of the lamp bracket unit.

Figure 1:
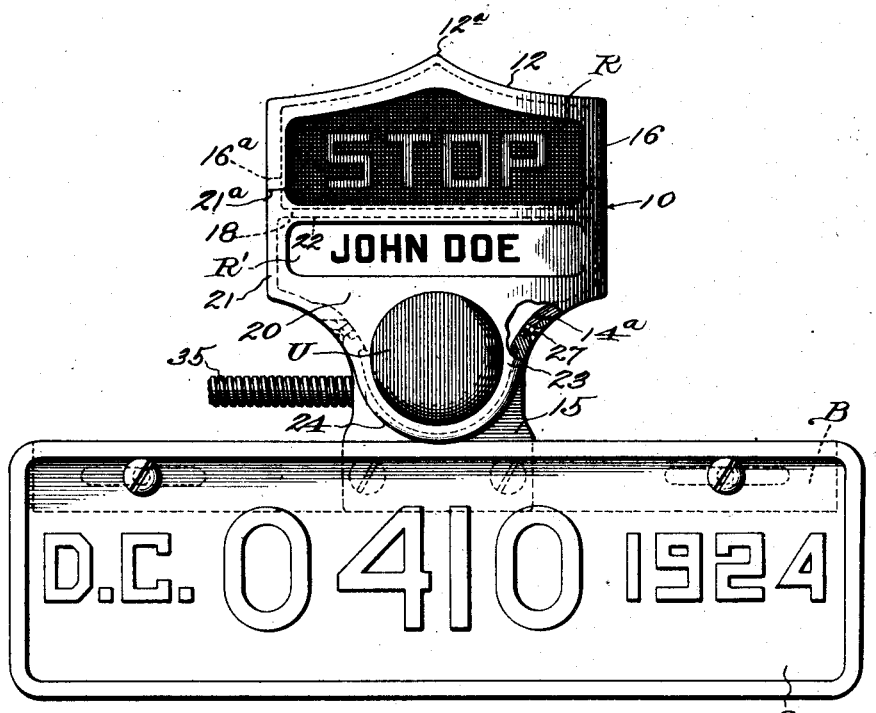
Fig. 1 is a front elevation of a combined tail and stop signal light embodying the invention, and showing a license plate and holder in mounted position thereon.

The principles and several features of the invention are presented herewith purely by way of example and not of limitation, as embodied in a combination rear or tail and stop signal light for automobiles. This adaptation of the invention is selected because the several problems overcome and disadvantages eliminated by the invention are encountered in this type of vehicle light in a high degree, and hence the principles and features of the invention can be more clearly disclosed and explained therefrom. However, it will be apparent to those skilled in the art that all features of the invention are not limited to the type of light shown but are equally adapted for application to and embodiment in signal and other types of lights generally.

In the example illustrated in the accompanying drawings a combination tail and stop signal light embodying the invention includes a casing or housing 10 within which are mounted suitable signal lamps and which is provided with suitable lenses or transparent panels for illumination by the signal lamps. The casing or housing 10 is preferably, as in the illustrated example, cast or otherwise suitably formed of a relatively light weight metal, such as aluminum or an alloy thereof, and includes a back or rear wall 11, top wall or roof 12, and opposite side walls 14. The rear wall 11 of casing 10 is curved transversely with the opposite walls 14 extending forwardly therefrom and integral therewith, and is further formed with an integral depending portion 15 reduced in width and extending downwardly in continuation of the rear wall to provide a supporting member by which the casing is mounted in position on a vehicle, as will be more fully referred to hereinafter.

The roof or top wall 12 of the casing 10 is formed with a central ridge or elevated rib portion 12a, and opposite outwardly and downwardly sloping or inclined side portions to provide for rapidly shedding water or other matter falling thereon and to prevent accumulation thereof on the casing. This formation of the casing top wall 12 will be readily apparent and understood by reference to the accompanying drawings.

Figure 2:
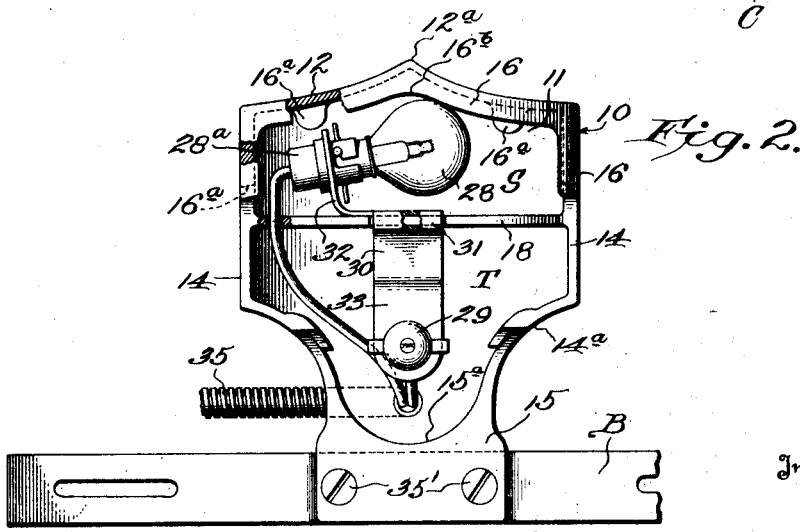
Fig. 2, is a front elevation with the lenses and removable face portion or frame detached to show the lamp bracket and lamps in mounted position.

The lower end portions 14a of the opposite side walls 14 of casing 10 are curved inwardly and downwardly toward each other following and conforming to the outline of the reduced depending end portion 15 of the rear casing wall 11, and terminate a distance above the lower end of the portion 15, as particularly shown by Figs. 2 and 4 of the accompanying drawings. The front of the casing 10 is open and is provided at the upper portion thereof with an integral face plate or lens frame 16 extending across and depending from the top wall 12, and extending a distance downwardly along and inwardly from the opposite side walls 14 of the casing, to form a lens or panel receiving flange. Depending lugs 16a are formed integral with the top wall 12 within the casing and spaced from the flange 16 to provide a space to receive the upper end edge portion of a lens or panel, as will be explained. An interior transverse dividing wall or web 18 is provided integral with the casing 10 and extending thereacross, in the present instance a distance below the lower ends of the flange portion 16, and dividing the casing 10 into an upper light chamber or compartment S and a lower compartment T. The rear casing wall 11 in the compartment T is depressed or formed concave for a distance downwardly onto the reduced portion 15 below the side wall portions 14a, and this depressed portion terminates at the lower end thereof in the curved shoulder forming edge 15a, as particularly shown by Figs. 2 and 5 of the drawings.

A removable front lens carrying face plate or frame 20 is provided for detachable mounting on and to the lower front portion of the casing 10. In the present instance this face plate or frame embodies side members 21 and a cross member 22 forming a lens frame at the upper portion thereof, and a reduced depending face portion 23 having a lens opening therethrough and terminating in a rounded lower edge portion 24. The reduced depending face portion 23 is provided with a rearwardly extending flange 25 thereabout which is extended rearwardly at the opposite upper ends thereof to form the bars 26 adapted to fit against the lower edges of the portions 14ª of side walls 14. (See Fig. 4.) The removable front lens carrying face plate or frame 20, so formed, is attached in mounted position over the front of casing 10 with the lens opening formed by side members 21 and cross member 22 disposed over and across the upper portion of light compartment T and with the lens opening formed through the reduced portion 23 disposed over the lower portion of compartment T. In mounted position the upper ends of side members 21 fit against the lower ends of the flange 16, and the rearwardly extending bars 26 fit against the lower edges of the side walls 14 and at their rear ends bear against the rear wall portion 15, the curved lower edge portion 24 and flange 25 extending over and surrounding the lower curved edge 15ª of the depressed portion of the reduced depending end 15 of rear casing wall 11, as shown particularly in Fig. 4. The removable face plate or frame 20 is detachably mounted in the foregoing position on casing 10 by machine screws 27 or other suitable fastening means extended through the rearwardly extending bars 26 and the portions 14ª of the casing side walls 14.

The lower ends of the opposite sides of the flange forming member 16 integral with the casing 10, are undercut at 16ª, and the upper ends of the side members 21 of the face plate or frame 20 are beveled at 21ª, so as to from a tight substantially leak-proof upwardly extending joint to prevent entry of water or other foreign matter. Due to the formation of the top wall 12 of the casing with the integral lens frame 16 across the upper portion of the casing, all joints, or openings are eliminated and a substantially leak and weather proof casing is formed with the removable face plate or lens frame 20 in mounted position thereon. All joints formed by the removable frame 20 with the casing 12 are disposed on the sides of the casing or on under portions thereof covered and protected by unbroken parts of the casing, as will be apparent by reference to Fig. 4 of the drawings in particular.

The compartment S formed in the casing receives a suitable lamp for illuminating the "stop" or other desired signal, which is formed by a suitably colored, preferably red, lens or transparent panel R mounted on and extending across the upper portion of the casing, and removably maintained in position closing compartment S by the flange forming frame 16 and the removable face plate or frame 20. The lens or panel S is of sufficient depth or length to extend down over, across the upper part of compartment T and to close and be exposed through the lens opening formed in the removable face plate 20 by the side members 21 and cross member 22, these latter members fitting over and bearing against the depending portion R' of lens R to maintain the same in proper position. The lens forming portion R' of the transparent panel or lens R is illuminated from the tail light compartment T of casing 10, and is intended to carry, if desired, suitable advertising matter which will be visibly displayed thereby, such for example as lettering, words or such like applied or formed on the panel. Preferably, as illustrated herewith, the panel R' is formed integral with the panel or lens R as a part thereof, although if desired the lens or panel R' can be formed as a separate element.

A circular lens or bull's eye U of concavo-convex form is mounted in and closing the lens opening formed through the reduced lower end portion of the face plate 20 and in mounted position is disposed over the light compartment T of casing 10, for illumination therefrom. This lens U forms the tail or rear signal and is preferably colored red in accordance with the prevailing practice. Another lens or transparent panel V (see Figs. 4 and 5) is mounted in and extending around the rounded lower end 24 and the flange 25 of the reduced portion of the removable face plate or lens frame 20. This lens or panel V is mounted extending rearwardly from flange 25 and is curved upwardly at the opposite ends to and bearing against suitable flanges or shoulders (not shown) on the inner faces of the opposite portions 14ª of the casing side walls 14. With the removable face plate and lens carrying frame 20 in mounted position the lens V bears against and around the shoulder formed by the curved lower edge 15ª of the depressed portion of rear wall extension 15, and thus closes the lower or under side of the casing 10. Lens or transparent panel V is preferably clear and is illuminated from the tail light compartment T so as to provide for projecting light therefrom onto a license tag or plate which may be mounted therebelow within range of this lens.

Suitable electric lamps or bulbs are mounted in the compartments S and T of the casing for illuminating the various lenses forming the signals as referred to. The lamp or bulb within the compartment S is intermittently operated by suitable mechanism, in the usual or any other desired manner as will be understood by those familiar with this type of signal light, to illuminate the lens R and give the stop signal when a vehicle on which the light is mounted slows down or comes to a stop. The lamp within compartment T is continuously operated to illuminate the colored tail signal lens or bull's eye U and indicate the rear or tail of a vehicle on which mounted, as well as to continuously illuminate the advertising lens or panel R'. In practice it is found that the electric lamp for compartment T can be of the relatively small low candle power type, and efficiently illuminate lenses U and R', while the lamp in compartment S must be of relatively large high candle power type in order to very brightly illuminate the stop signal lens R and give the desired sharp and clear stop signal.

According to the present invention a relative arrangement and mounting of the different size lamps is provided by which a casing of relatively small thickness is possible and with which ready access to the lamps is obtained for removal and replacement. In the illustrated mechanical expression of this feature of the invention a relatively large high candle power electric lamp 28 is provided for compartment S, and a relatively small low candle power lamp 29 is provided for compartment T, which lamps are mounted on and carried by a unit mounting or bracket 30. The unit lamp mounting or bracket 30 is formed of a strip or blank of resilient or spring sheet material, such for example as sheet brass or the like, and embodies a substantially U-shaped base portion 31 and the opposite lamp socket receiving and supporting arms 32 and 33 extending therefrom and integral therewith. The arm 33 extends from and in longitudinal continuation of the base member 31, while the arm 32 extends and is laterally offset from the base member to terminate in the bent up portion disposed in a plane transverse to the plane of the arm 33. The free end portions of the arms 32 and 33 are formed with socket receiving bores therethrough in which are mounted the sockets 28ª and 29ª of any desired or suitable type. The formation of the unit bracket 30 is clearly shown in and will be readily understood by reference to Fig. 6 of the accompanying drawings.

The unit lamp mounting bracket is mounted in the casing by the U-shape base 31 which is fitted over the casing dividing wall or web 18, with the arm 32 extending into the compartment S and the arm 33 depending into the compartment T, as shown in Figs. 2 and 5. The upper leg of the base 31 fits and bears upon the upper surface of the wall 18 and the outer end or edge of the base is fitted and seated in a cut away portion of the outer edge of wall 18, so that the outer edge of the base is substantially flush with the edge of wall 18 and is maintained in mounted, installed position by the cross member 22 of the removable face plate or frame 20 which bears against this portion of the base. This formation of wall 18 and mounting of the bracket 30 is shown particularly by Figs. 2 and 5. In mounted position the arm 32 is disposed at one side of compartment S facing a side wall of the casing, while the arm 33 depends into compartment T facing the front of the casing and the lens U. The relatively large high candle power electric lamp 28 for the stop signal is fitted into socket 28ª in compartment S and is thus positioned with its longitudinal axis disposed crosswise or transversely of the compartment S and casing 10, so that the casing need only be of a thickness sufficient to receive the width or diameter of the large lamp 28, instead of the overall length of the lamp and socket therefor. The relatively small low candle power lamp or bulb 29 for the tail or rear signal is fitted into the lamp socket 29ª on arm 33 in compartment T and is disposed lengthwise or with its longitudinal axis extending from front to rear of the compartment T and opposite or facing the tail signal lens U. It will be noted that the lens U projects outwardly from casing 10 and increases the space within which to dispose lamp 29. Thus, the mounting unit or bracket 30 relatively disposes and arranges the lamps 28 and 29 with their longitudinal axis transverse to each other with the large lamp 28 positioned crosswise of the casing so that the thickness of the casing can be formed throughout sufficient to properly house and position the small lamp 29 without an increase in thickness to accommodate the overall length of the large lamp 28 and socket therefor, which latter lamp is so disposed as to fit within the casing of such relatively small thickness.

The arms 32 and 33 of the unit lamp bracket 30 are formed of a spring or resilient material so that in mounted position in the casing they provide shock absorbing elements for the lamps 28 and 29 mounted thereon and materially reduce the effect of vibration on said lamps and resulting breakage of the lamp filaments. With the removable face plate or lens frame and lenses in mounted position on and closing the casing the lamp bracket is maintained in proper position by the face plate bearing on the bracket base 31 and the lamps are secured in operative position relative to the various lenses. In order to remove and replace lamps from and to position on the unit bracket 30 in the casing, the removable face plate 20 is detached and lens or panel R—R' removed which releases the bracket 30. The bracket can then be drawn or swung outwardly from the casing with the lamps readily accessible without interference from the casing. Attention is directed to the shape of the top 12 of the casing and frame forming flange 16 to provide a cut away or raised portion 16b to permit of the lamp or bulb 28 passing freely to and from compartment S without interference from the casing. This formation of casing 10 permitting further reduction in size and material and assisting in the provision of a casing of maximum compactness.

The combination tail and stop signal light as described is mounted on an automobile or other vehicle in any desired manner by means of the depending portion 15 of casing 10. In the example shown, a portion of a brace member or other element A at the rear of a vehicle is more or less diagrammatically illustrated, and carrying a license plate or tag bracket B to the central portion of which the depending portion 15 of the casing 10 is secured by the bolts or screws 35. A license plate or tag C (Fig. 1) is secured depending from bracket B and is thus disposed in position below and illuminated by lens V from lamp 29 in compartment T. The electric lamps 28 and 29 are suitably electrically coupled with any desired source of electrical energy (not shown) carried by the vehicle, as will be readily understood. In the example of the invention shown herewith, due to the hereinbefore described formation of casing 10 and arrangement of lamps therein, it is possible to carry the electrical conductors or wires for the lamps in a single conduit from the casing, such as the flexible conduit 35 in which are housed the wires or cables 36 and 37 from the source of current. An opening is provided at the lower end of the casing rear wall 11 through which cables 36 and 37 extend from conduit 35 into the compartment T. The cable 37 is connected to the lamp socket 29a for operating lamp 29, and the cable 36 is extended upwardly through the casing dividing wall 18 into compartment S where it is connected to socket 28a for operating lamp 28.

Preferably the front of casing 10 is transversely curved rearwardly as shown by Figs. 3 and 4 so as to reduce the thickness of the casing at the sides and contribute to the compactness of the assembled light. By the foregoing construction and formation of the casing 10 and by the arrangement of the lamps therewithin an extremely compact combination tail and stop signal light is provided of relatively small size yet efficient in operation which can be readily mounted on a vehicle to occupy a minimum of space. The lamps of the device are readily accessible and their life in use is materially lengthened by the resilient or spring mounting formed by the unit lamp bracket 30, through the medium of which both lamps can be simultaneously moved to position for removal and replacement.

It is evident that various changes, variations, modifications and substitutions might be resorted to without departing from the spirit and scope of our invention, and hence we do not desire to limit ourselves to the exact and specific disclosures hereof.

Desiring to protect our invention in the broadest manner legally possible, what we claim is:

1. In a casing for signal and the like lights, a rear wall, top wall and opposite side walls integral therewith, an integral lens frame forming flange across the top wall and extending a distance along the side walls, and a removable face plate forming a lens frame detachably mounted on said casing below and forming a continuation of said integral frame forming flange.

2. In a casing for signal and the like lights, a rear wall, top wall and opposite side walls integral therewith, an integral lens frame forming flange across the front of the top wall and extending downwardly a distance along the front of the side walls, and a removable face plate forming a lens frame detachably mounted on the front of the casing below and forming a continuation of said integral frame forming flange thereabove, the lower ends of the integral frame forming flange undercut and the upper ends of the removable frame forming face plate beveled and received in said undercut ends of the integral frame flange.

3. In a casing for signal and the like lights, a rear wall, top wall and opposite side walls integral therewith, the top wall formed with an intermediate elevated ridge portion and opposite outwardly and downwardly inclined side portions to provide a water shedding upper surface for the casing, an integral lens frame forming flange across and depending from the front of the top wall and extending downwardly a distance along the front of the side walls, and a removable lens frame forming member detachably mounted on the front of the casing below and in continuation of the integral frame forming flange, the upper ends of said removable member alined with and abutting the lower ends of said integral flange to form joints therewith below and protected by said water shedding top wall and the said integral frame forming flange.

4. In a casing for signal and the like lights, the face thereof formed with a lens carrying frame the upper portion of which is integral with the casing and the lower portion of which is removable, the joints formed between said integral upper portion and said removable lower portion disposed beneath and protected by the said upper integral frame portion.

5. In a signal light, a casing having a horizontally disposed transverse wall forming an upper compartment and a lower compartment therewithin, a detachable lens carrying face plate on said casing, and a unit lamp mounting extending across the front edge of said wall and into each compartment for positioning a lamp therewithin, the said unit mounting supported on said casing wall and maintained in position in the casing by said face plate in attached position, said unit lamp mounting movable outwardly from the casing with the face plate detached.

6. In a combined tail and stop signal light for vehicles, a casing having a transverse dividing wall forming upper and lower compartments therewithin, a detachable lens carrying face plate on said casing, and a unitary lamp mounting bracket formed of resilient sheet material and embodying a U-shape base fitting over and supported on the casing dividing wall, and opposite lamp carrying resilient arms extending into said upper and lower compartments, respectively, an electric lamp mounted on each of said arms, said detachable face bearing against the base of said bracket on the dividing wall to maintain the same with said lamps in position within the casing.

Signed at Baltimore, Maryland, this 15th day of April, 1924.

JOHN S. WILLIAMSON.
HERBERT L. BEACH.